United States Patent [19]
Dierickx

[11] Patent Number: 5,953,060
[45] Date of Patent: Sep. 14, 1999

[54] METHOD FOR REDUCING FIXED PATTERN NOISE IN SOLID STATE IMAGING DEVICES

[75] Inventor: Bart Dierickx, Mortael, Belgium

[73] Assignee: IMEC vzw, Leuven, Belgium

[21] Appl. No.: 09/164,158

[22] Filed: Sep. 30, 1998

Related U.S. Application Data

[62] Division of application No. 08/742,241, Oct. 31, 1996.
[60] Provisional application No. 60/007,087, Oct. 31, 1995, and provisional application No. 60/026,345, Sep. 19, 1996.

[51] Int. Cl.[6] ............................. H04N 5/217; H04N 3/14
[52] U.S. Cl. ........................................ 348/241; 348/308
[58] Field of Search ........................... 348/241, 246, 348/248, 308, 243, 249, 607

[56] References Cited

U.S. PATENT DOCUMENTS

| | | |
|---|---|---|
| 4,274,113 | 6/1981 | Ohba et al. . |
| 4,580,103 | 4/1986 | Tompsett . |
| 4,581,103 | 4/1986 | Levine et al. . |
| 4,628,274 | 12/1986 | Vittoz et al. . |
| 4,809,074 | 2/1989 | Imaide et al. . |
| 5,122,881 | 6/1992 | Nishizawa et al. . |
| 5,162,912 | 11/1992 | Ueno et al. ............................. 348/241 |
| 5,182,446 | 1/1993 | Tew ........................................ 348/241 |
| 5,270,531 | 12/1993 | Yonemoto ............................... 348/308 |
| 5,296,696 | 3/1994 | Uno . |
| 5,306,905 | 4/1994 | Guillory et al. ........................ 348/241 |
| 5,311,319 | 5/1994 | Monoi . |
| 5,321,528 | 6/1994 | Nakamura . |
| 5,345,266 | 9/1994 | Denyer . |
| 5,434,619 | 7/1995 | Yonemoto ............................... 348/241 |
| 5,625,322 | 4/1997 | Gourgue et al. . |
| 5,656,972 | 8/1997 | Norimatsu . |
| 5,737,016 | 4/1998 | Ohzu et al. ............................. 348/241 |
| 5,793,423 | 8/1998 | Hamasaki ............................... 348/241 |
| 5,808,677 | 9/1998 | Yonemoto ............................... 348/308 |
| 5,841,126 | 11/1998 | Fossum . |

FOREIGN PATENT DOCUMENTS

| | | |
|---|---|---|
| 239 844 | 11/1987 | European Pat. Off. . |
| 412 567 | 10/1989 | European Pat. Off. . |
| 665685 | 2/1995 | European Pat. Off. . |
| 657863 | 6/1995 | European Pat. Off. . |
| 773669 A2 | 5/1997 | European Pat. Off. ......... H04N 3/15 |
| 2324651 | 10/1998 | United Kingdom . |
| WO 92/1699 | 1/1992 | WIPO . |

OTHER PUBLICATIONS

Martin, W.J. et al., "Dynamic Offset Null", *IBM Technical Disclosure Bulletin*, vol. 23, No.9, Feb. 1981.
European Patent Office search report, Apr. 2, 1998.
European Patent Office search report, Jun. 24, 1992.

*Primary Examiner*—Wendy Garber
*Assistant Examiner*—Luong Nguyen

[57] ABSTRACT

An amplifying circuit comprising an amplifying element and a memory element as well as an element to adjust the signal in an output terminal of the amplifying element to a known level, a measure of the corresponding level in a control terminal of the amplifying element being stored on the memory element.

10 Claims, 11 Drawing Sheets

METHOD FOR REDUCING FIXED PATTERN NOISE IN SOLID STATE IMAGING DEVICES

RELATED APPLICATIONS

This application is a divisional application which claims priority under 35 U.S.C. § 121 from a co-pending and commonly-owned U.S. application entitled, "Circuit, Pixel, Device and Method for Reducing Fixed Pattern Noise in Solid State Imaging Devices," application Ser. No. 08/742, 241 and filed on Oct. 31, 1996. This application claims benefit of provisional applications 60/007,087 filed Oct. 31, 1995, and 60/026,345, filed Sep. 19, 1996.

BACKGROUND OF THE INVENTION

1. Field of the Invention

The present invention relates to solid state imaging devices being manufactured in a CMOS- or MOS-technology. More particularly, an amplifying circuit and a method for eliminating fixed pattern noise in the output signal of a pixel or of an image sensor are disclosed.

2. Description of Related Technology

Solid state image sensors are well known. Commonly solid state image sensors are implemented in a CCD-technology or in a CMOS- or MOS-technology. Solid state image sensors find a widespread use in camera systems. In this embodiment a matrix of pixels comprising light sensitive elements constitutes an image sensor, which is mounted in the camera system. The signal of said matrix is measured and multiplexed to a so-called video-signal.

CCD-based camera systems have less noise fluctuations in the image compared to CMOS- or MOS-based camera systems. Therefore CCD-based camera systems are nowadays preferred in applications wherein a high image quality is required such as video or still camera applications. Due to the further miniaturization of the CMOS electronics technology, it is possible to realize complex CMOS- or MOS-based pixels as small as CCD-based pixels. It is a further advantage of CMOS- or MOS-based pixels that CMOS is a technology being offered by most foundries whereas CCD-technology is rarely offered and a more complex and expensive one.

Of the image sensors implemented in a CMOS- or MOS-technology, CMOS or MOS image sensors with passive pixels and CMOS or MOS image sensors with active pixels are distinguished. An active pixel is configured with means integrated in the pixel to amplify the charge that is collected on the light sensitive element. Passive pixels do not have said means and require a charge-sensitive amplifier that is not integrated in the pixel and is connected with a long line towards the pixel. For this reason, active pixel image sensors are potentially less sensitive to noise fluctuations than passive pixels. Due to the additional electronics in the active pixel, an active pixel image sensor may be equipped to execute more sophisticated functions, which can be advantageous for the performance of the camera system. Said functions can include filtering, operation at higher speed or operation in more extreme illumination conditions. It remains however a main drawback of active pixel CMOS or MOS image sensors, hampering their use in applications requiring a high image quality, that their output signal has an additional non-uniformity caused by the statistical spread on the characteristics of the electronic components composing the active pixel. An example of such characteristic being subject to manufacturing process variations is the threshold voltage of MOS transistors integrated in the pixel. If no precautions are taken, this non-uniformity, called fixed pattern noise or FPN, is seen as a "snow-like" shade over the image being taken with a CMOS or MOS image sensor with active pixels.

Document U.S. Pat. No. 4,274,113 discloses a solid state imaging device having a sensor portion and a signal processing circuit. Said signal processing circuit comprises means to eliminate fixed pattern noise. In this device the charge collected on a passive pixel is measured on a common charge amplifier. The pixel is sampled two times consecutively, and the difference of charges is constituting the signal. The first sampling is taken with the pixel not connected to the output, the second sampling is taken with the pixels connected to the output for a short time, so that the charge is integrated in the output. This method to eliminate FPN however is not suited for active pixels which have not a charge output, but which have a voltage output or current output or similar. Also, as disclosed in the preferred embodiment of U.S. Pat. No. 4,274,113, reading charge over a large bus with high capacitance deteriorates the temporal noise in the final sensor image.

Document U.S. Pat. No. 4,809,074 discloses a solid state imager having a signal processing circuit for reducing noise, in particular FPN. Each pixel has two switches, which makes it possible to read a pixel charge with less noise and FPN than in pixels with only one switch. The FPN cancellation is performed by reading twice the charge on the output node. Again, the method disclosed in this patent is not suited for active pixel imaging sensors.

The patent application Ser. No. WO92/16999 discloses a circuit for minimizing the variation in characteristics across different parts of an imaging device caused by manufacturing process variations between a plurality of inverting amplifiers in said imaging device. Said circuit comprises at least one transistor connected in series with a power supply terminal on each of the inverting amplifiers so as to provide a new reference level for each inverting amplifier whereby the switching threshold of the inverting amplifier is controllable by a voltage applied to a control input connection of said transistor. This method applies only for an imaging device with passive pixels.

Document EP-A-0665685 discloses an active pixel image sensor. This patent describes a method to cancel non-uniformity of the pixel response. This method is based on the fact that all pixels outputs are fed through switches and column/row buses to a common output, without passing trough intermediate (column) buffers. This method is viable, but it requires the output stage of every individual pixel to be powerful enough to drive the buses/output lines at a high readout speed. The proposed method furthermore adds additional fixed pattern noise by the multiplexing structures.

SUMMARY OF THE INVENTION

The present invention discloses a device such as an image sensor which permits to reduce fixed pattern noise (FPN) which is invariant in time, without introducing noise of other origin. This device comprises a matrix of active pixels as well as electronic components or circuits located by preference at the edges or border of the matrix of pixels. At the expense of forming an image sensor with an unusual large area, said electronic components or circuits can also be integrated in said pixels. Said electronic components or circuits comprise at least one amplifying circuit which is common to a group of pixels such as a column or a row in said matrix. Furthermore, said device has an output line that is preferably common to said matrix. The amplifying circuit comprises an amplifying element and a memory element that are connected to circuitry that is provided to change the signal in the output terminal of said amplifying element to a known level, and to store the corresponding level, or a measure thereof, in the control terminal of said amplifying element on said memory element. The active pixels are adapted for being brought in a state corresponding to an amount of radiation collected on said pixel, and can therefore be changed in to a first state. It is required that this first state can be compared to a second state that is different. Said first state can correspond to an amount of collected radiation or light on the radiation or light sensitive element in said pixel. Said first state can also correspond to the reset state of the pixels or to a non-illuminated or dark condition of the pixel. Said second state can correspond to a non-illuminated or dark condition of the pixel, or to an amount of collected radiation or light on the radiation or light sensitive element in said pixel, or to the reset state of the pixel.

Preferably, the amplifying element is a transistor and more particularly of the type of metal oxide semiconductor transistors wherein said output terminal is the source or the drain of the transistor and wherein the control terminal is the gate of said transistor. It also can be a more complex amplifier in its own. The memory element is preferably a capacitor or a nonvolatile memory element as used in ROMs, EPPROMs, EEPROMs, or flash EEPROMs.

In a first aspect of the present invention, an amplifying circuit is disclosed comprising an amplifying element and a memory element, as well as connections and circuits to adjust the signal in an output terminal of the amplifying element to a predetermined level, a measure of the corresponding level in a control terminal of the amplifying element being stored on the memory element.

In a second aspect of the present invention, a device for imaging applications comprising said amplifying circuit and comprising a group of pixels is disclosed.

In a third aspect of the present invention, a pixel is disclosed, adapted for integration in an imaging device, comprising an amplifying circuit with an amplifying element and memory element as well as connections and circuits to adjust the signal in an output terminal of said amplifying element to a known level, a measure of the corresponding level in a control terminal of said amplifying element being stored on said memory element. Said pixel has preferably a photo sensitive element such as a photodiode or an infrared photo detector.

In a fourth aspect of the present invention, a method is disclosed for eliminating fixed pattern noise, which is invariant in time, in the output signal of an image sensor making use of said device.

The method is as follows:
the readout output signal of essentially each pixel in said image sensor when in a first state, is compared, by preference subtracted from, the signal of the same pixel when in a second state. Only the compared, by preference subtracted, signal of both states is transferred to a common output line. The two states are to be read out consecutively by preference. This method further comprises the step that the output voltage of the amplifying element or amplifier, that is placed per column by preference at the border of the pixel matrix, is forced to a known output voltage during the read out of the first state, by adjusting an offset through a feedback mechanism. If afterwards the output signal of the said pixel in said image sensor when in a second state is being read out, the output voltage of the amplifier shifts proportional to the difference of both states. As a result, the output signal of the amplifying element or amplifier is changing essentially only due to the difference in the amount of light or radiation collected on the light or radiation sensitive element of the pixel between both states. Said output signal, therefore, does not include fixed pattern noise of pixels nor fixed pattern noise of the amplifier or amplifying element itself.

In a fifth aspect of the present invention, the use is disclosed of said imaging device and said method in camera systems and in imaging applications requiring a high image quality. An example of such camera system is a video or still camera or a camera integrated in a multimedia device such as a Personal Computer equipped with video functionality or with video and speech functionality. The imaging device of the present invention is configured as a pixel matrix that is used as a focal plane image sensor. As is well understood by a technologist in the relevant field, for this purpose the integrated circuit containing the pixel matrix and the peripheric circuits are packaged and mounted inside a camera housing with a lens, at the same place where a photographic film would be located.

DETAILED DESCRIPTION OF THE PREFERRED EMBODIMENTS

Figure 1:
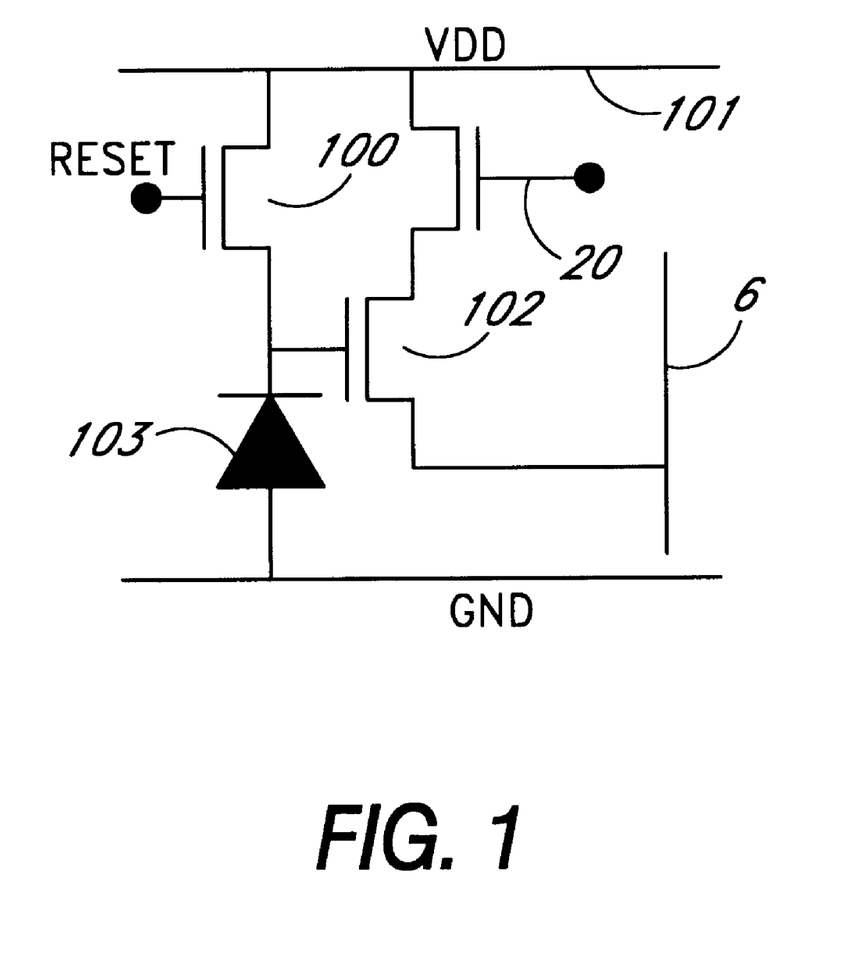
FIG. 1 shows an example of an active pixel containing three transistors, and a photodiode that can be used in the present invention.

In the sequel and for the purpose of teaching only an implementation of the image sensor as a sensor with nxm pixels in a double metal, single poly 0.7 $\mu$m CMOS process can be assumed. The size of such image sensor with 384× 288 pixels is 6, 3×5, 7 mm. The dimensions of the light sensitive elements in the photodiodes of the pixels are 14×14 $\mu$m. Photodiodes of this size generate currents of about 1 nA at light illumination level of 1 mW/cm$^2$. It is obvious that these numbers represent only one option within the art and that many other implementations will be evident for those skilled in the art. An example of an active pixel (1) containing three transistors (100),(101),(102) and a photodiode (103) that can be used in the present invention is shown in FIG. 1. Switch (20) and line (6) have the same function as the parts (21),(23),(71),(73), and (6),(56) respectively in the FIGS. 2 and 5. A pulsed signal on gate "RESET" will zero the accumulated charges on the photodiode (103), i.e. its forces the pixels in a "reference state".

Figure 2:
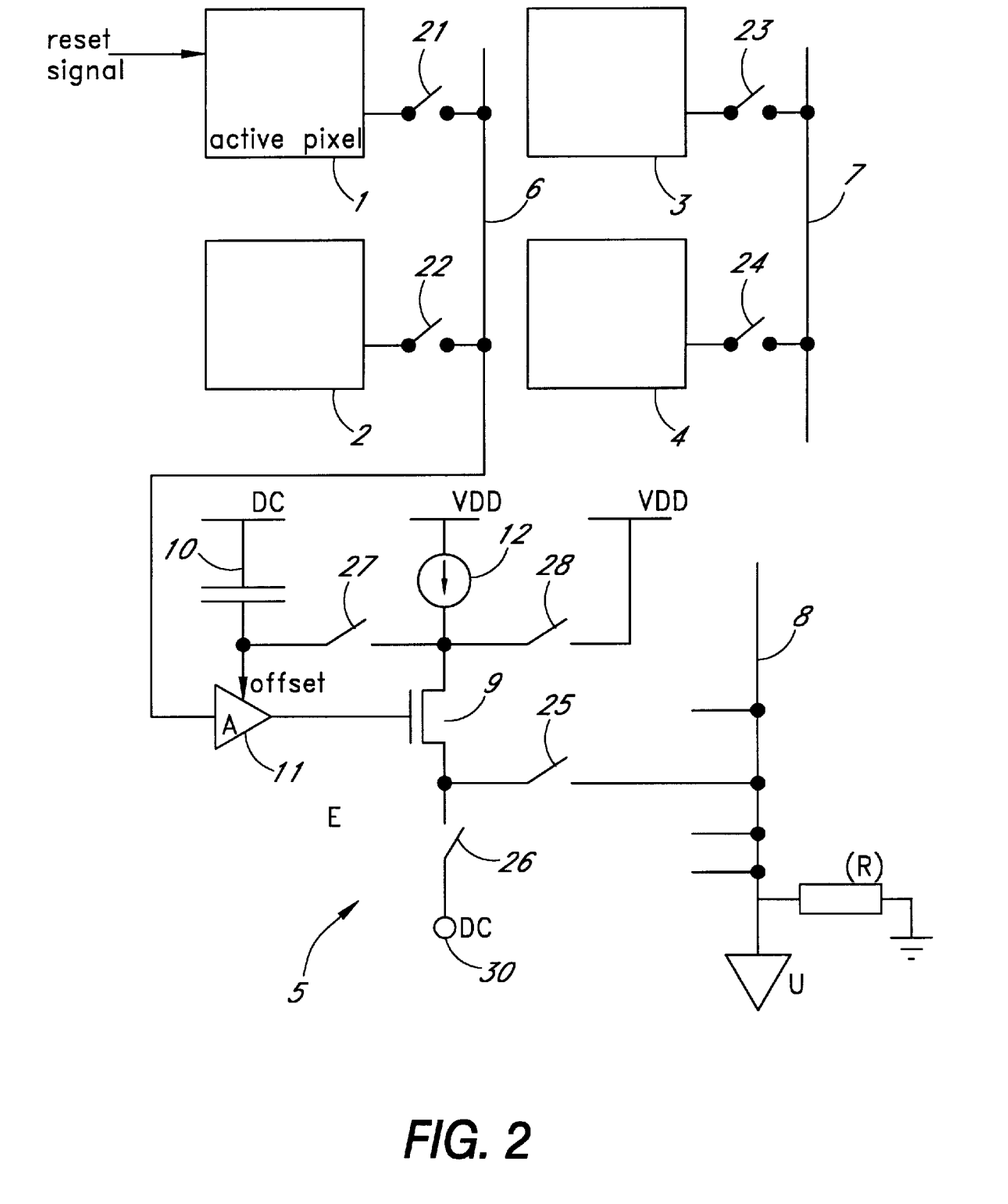
FIG. 2 shows an embodiment of the device for imaging applications according to the present invention.

A device to readout active pixels or parts of an imager with active pixels is the scheme represented in FIG. 2. In this figure an arbitrary array of 2 by 2 active pixels (1),(2),(3),(4) is drawn with one column amplifier (in this text also referred to as the amplifying circuit) (5). Said column amplifier (5) may as well be integrated within each pixel (1),(2),(3),(4), so as to form a more elaborate active pixel in its own, at the cost of area. This integration may be a preferred option for imaging devices and for a sensor device for non-optical applications which are arranged in a fashion which is not row/column wise, for instance, linear image sensor.

The output signal of an active pixel (1),(2),(3),(4) is via an optional switch (21),(22),(23),(24) read out over a line (6),(7) and is passed to a common output bus (8) via an optional switch (25). Non-uniformities of different signals on the different lines (6) and (7) of different such column amplifiers (5) are compensated at the output bus (8). The relative offsets of the input signals (6) and (7), including the offset non-uniformity induced by the output transistor (in this text also referred to as the amplifying element) (9) itself, is compensated by adjusting an offset compensation input of a second amplifier (11). This adjustment or calibration is carried out while forcing the active pixel that is being read out, or the signal on line (6) or (7) in general, to a reference state. For adjustment or calibration, switches (27) and (26) are closed. The Source of transistor (9) is thus forced to a known voltage (30). This known voltage (30) can be a supply voltage of the imaging device and is preferably common for all columns of the matrix of pixels. With appropriate circuit components and applied voltages and currents, which are straightforward for those skilled in the art, the voltage at the drain and gate of the transistor (9) will settle to an equilibrium value. One can predict the behavior of such circuits by the use of analog circuit simulators such as HSpice, commercialized by the company Metasoft. The offset needed to accomplish the equilibrium is stored in an analog memory which is represented as a capacitor (10) and a switch (27). Other ways to implement analog memory, known to the man skilled in the art, can be used for this purpose too. For the normal read out operation, the switches (27) and (26) are opened. Switch (28) is closed to allow for a large supply current for transistor (9). The optional switch (25) is used for each column amplifier (5) separately to connect to the bus (8) in sequential or in a random addressed manner.

The multiplexing done in this way through switch (25) may as well be accomplished in different ways.

Figure 3:
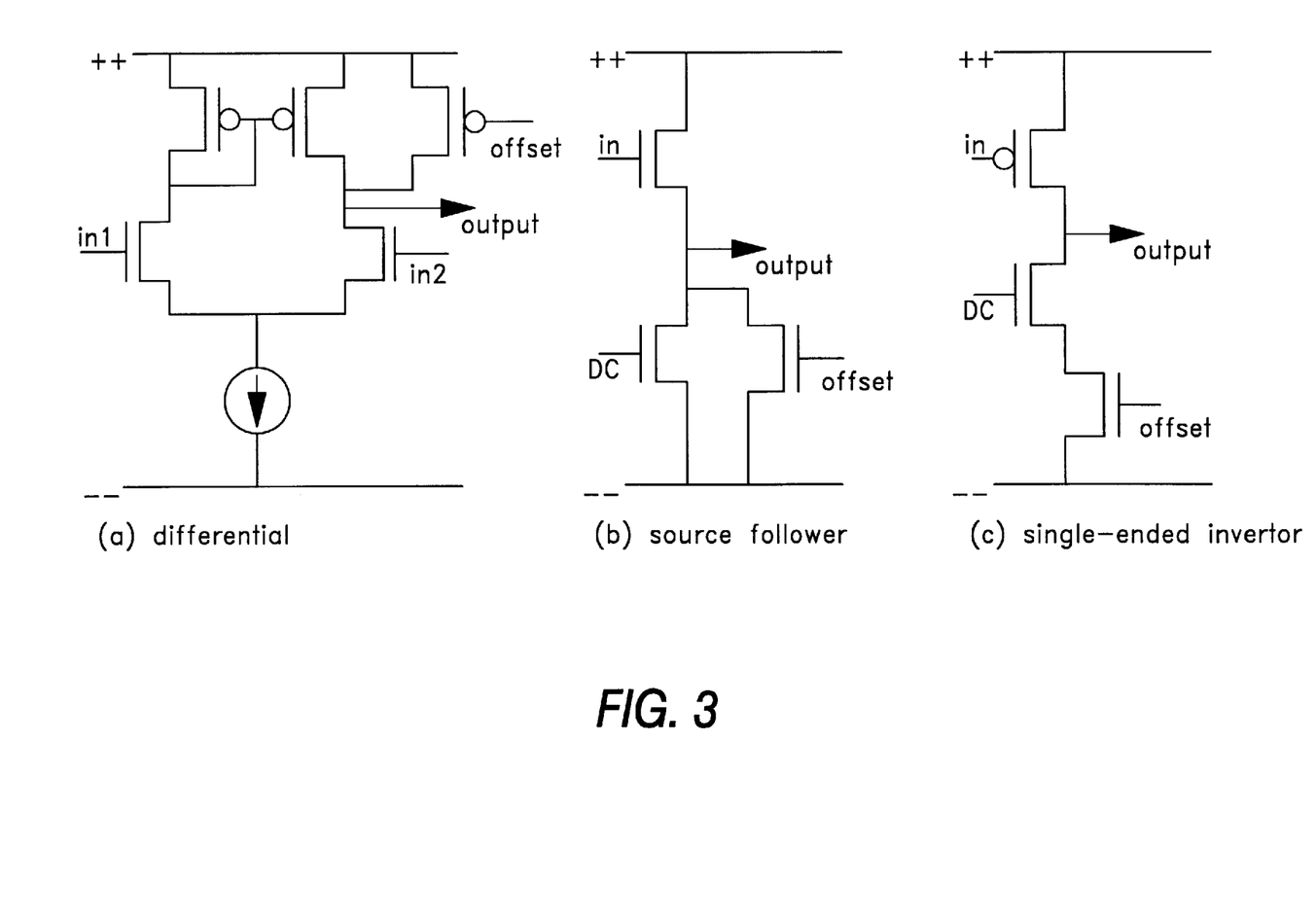
FIG. 3 shows three amplifiers that can be integrated as components (11),(61),(103),(111),(123) in the device for imaging applications according to the present invention.

The transistor (9) is preferably a MOSFET, but other types of active elements like bipolar transistors or thyristors, or JFETs are also appropriate. The second amplifier (11),(61) in FIGS. 2, 5 respectively is generic. Many known types of amplifiers can be used for this purpose, as long as there is provided means to adjust their offset voltage by an external voltage or current. Three of such second amplifiers, according to the art are shown in FIG. 3, with an offset adjusting means drawn in thick lines. The amplifier of FIG. 11 can be used for the same purpose. Note that the offset adjusting input is a voltage input in each of these cases. However, the input device is a MOSFET used as current source, so an input current could be applied as offset means directly as well, Note also that the second input of a two-input amplifier in itself can be considered also as an offset adjusting input, and can be used for that purpose.

The second amplifier (11) is not necessarily a unity amplifier. It may include also a filter function to improve e.g. signal to noise ratio. The use of a source follower transistor for second amplifier (11) is a simple and straightforward implementation.

The capacitor (10) in FIG. 2 is a means for analog memory. Other types of analog memory may be used instead, e.g. based on techniques used for the fabrication of non-volatile memories (ROM, EPROM, EEPROM), known to those skilled in the art. Analog memory can also be implemented by a combination of ADC and DAC and digital memory.

The current source (12) may be implemented in well-known ways, as e.g. a MOSFET with a voltage at the gate. In this way however, the currents of different column amplifiers (5) will have different values due to non-uniformities of the electronic devices. This non-uniformity of the currents will have second order effects on the uniformity of the final outputs on the bus (8). One can implement means to obtain more uniform or reproducible current sources (12). Those skilled in the art are aware about many such methods been devised in the past, e.g. for the fabrication of analog-digital convertors or digital-analog convertors.

One method consists in the use of one single current source for all said column amplifiers in the imaging array. The said single current source is applied to all column amplifiers in turn by means of switches.

Figure 4:
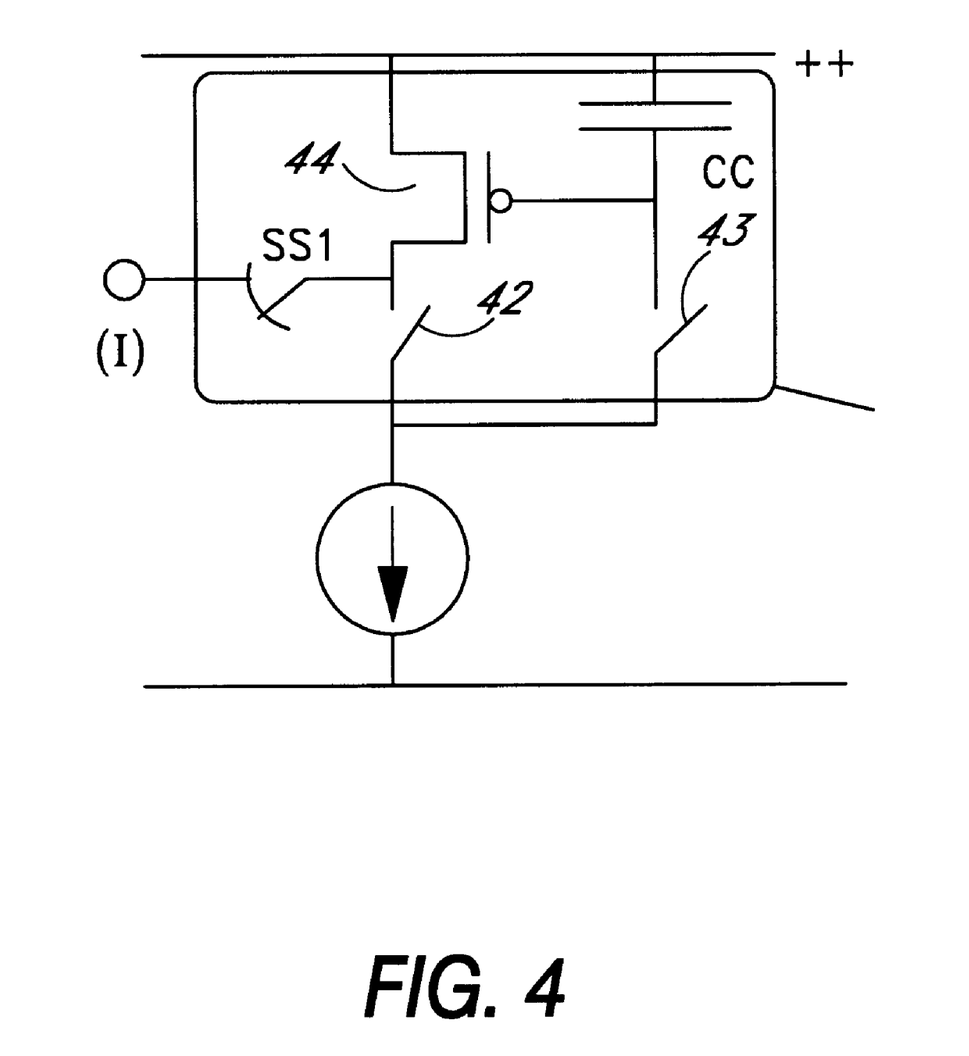
FIG. 4 shows current sources that can be used in the column amplifiers of the device for imaging applications according to the present invention.

Another method consists of the calibration of the current sources which are residing in each column amplifier during those time intervals that these currents are not in use: e.g. during the time that switch (28) in FIG. 2 is closed. This can be accomplished by a circuit configuration as depicted in FIG. 4. The output (I) of this subcircuit is the current source (12) depicted in FIG. 2. The switches (42) and (43) serve to connect and calibrate the MOSFET (44) for a known current level. Another method is the use of circuit components which are not MOSFETs and thus suffer less from non-uniformities, as resistors, Bipolar transistors or JFETs.

Figure 5:
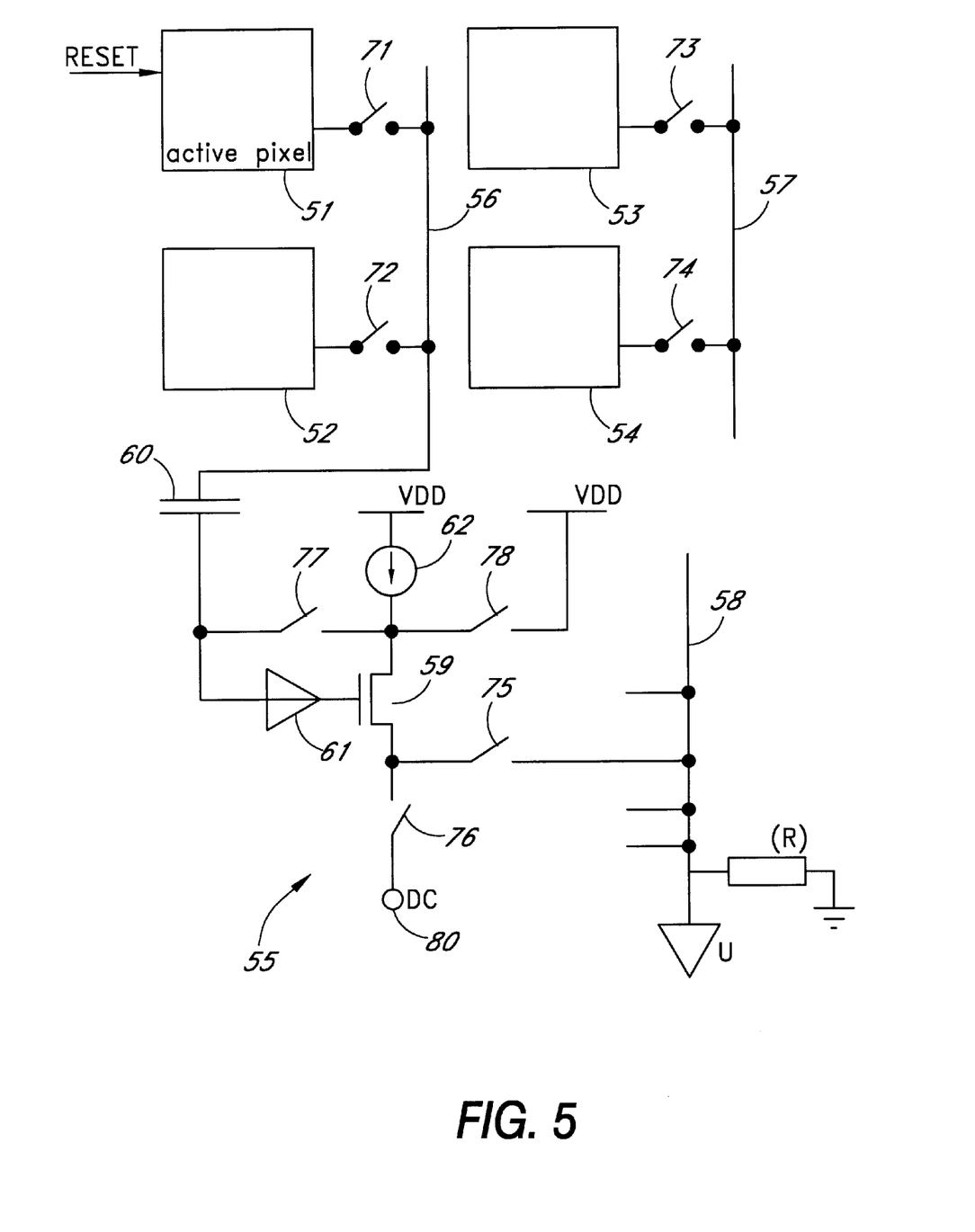
FIG. 5 shows another embodiment of the device for imaging applications according to the present invention.

An implementation of the imaging device according to another preferred embodiment of the present invention is shown in FIG. 5. A matrix of 2×2 active pixels is drawn. Every pixel (51),(52),(53),(54) can, via a switch (71),(72),(73),(74), impose its output signal to the column lines (56),(57).

A pixel can be switched in its reference state, e.g. via a "reset signal" (this is a common but not exclusive way to do such).

During the first of the two states, switches (77) and (76) are closed, and (78) and (75) remain open. The current source (62) delivers a small fixed current. For this reason, the source of MOSFET (59) comes to a fixed potential, and the gate of this MOSFET is forced to an equilibrium value. This value is memorized on the capacitor (60). The amplifier (61) at the gate of the MOSFET is not absolutely necessary, it may be shunted.

The possibly unwanted offset of the pixel signal stands now over the capacitor (60).

Before the second phase, the switches (77) and (76) are opened, and (78) and (75) potentially too are closed.

Consequently, on the source of the MOSFET (59) appears the signal that was there already during the first phase, except from a small fixed shift. This signal is offered to the common output amplifier "U" of the imaging device, which does not contribute to the FPN because it is common to the whole matrix.

During the second of the two states of the active pixel, the signal on line (56) changes. But this new signal contains the unwanted offset either via the capacitor (60) the change of this signal is applied to the gate of transistor (59), and when (75) is closed, to the output amplifier of the imaging device.

Many column amplifiers are in parallel on the output bus (58). One can then scan these amplifiers by activating their respective switches (75).

We draw the attention to the fact that the circuit in FIG. 5 is a special case of the circuit in FIG. 2. The combination of (60) and (61) in FIG. 5 is a second amplifier with AC-coupled input. This too is to be considered as an amplifier with offset adjustment terminal. The real input and the offset input are at both end of the said capacitor (60).

In fact the variant of the circuit in FIG. 2, where amplifier (11) is just a short circuit, thus the said combination of (60) and (61) being only a capacitor, should be considered for this reason as trivial case of an amplifier with offset correction too. This may be sufficient for the required functionality.

Other embodiments of the present invention are described in the sequel.

Figure 6:
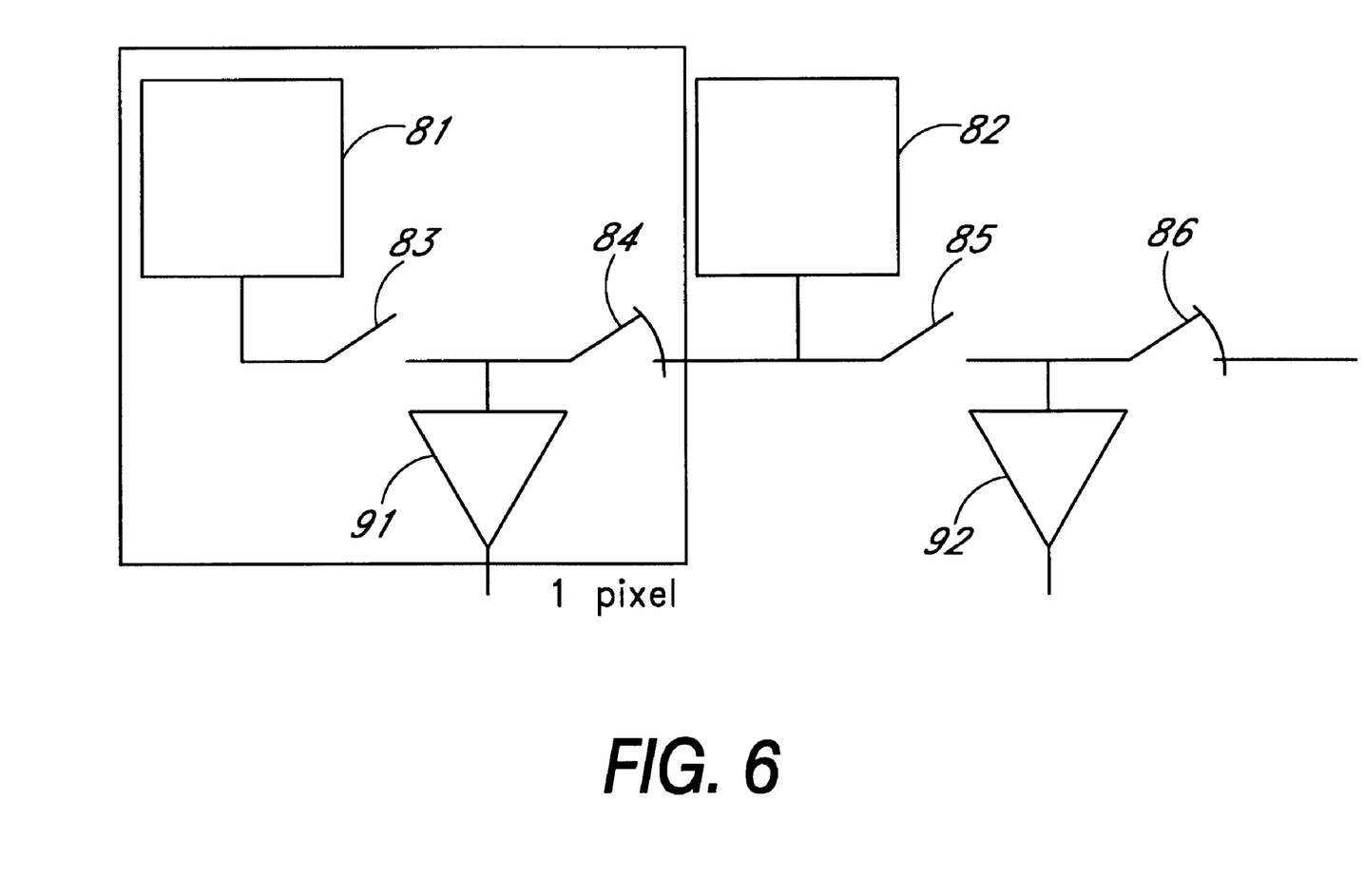
FIG. 6 shows two pixels of a structure that could be part of an array shown in FIGS. 2 or 5.

The active pixels to be used with this type of readout must obey only to one criterium, that they can be set in two or more different states, corresponding to different amounts of collected light, or to different signal levels in general. The signal path that generates the FPN should be in common for both states, i.e. pass through the same amplifying path in the pixel. Obvious variants are:

- Not limited to a simple pixel. An active pixel may be constructed so as to take its signal from different places and times, as e.g. from different photodiodes that may be shared with other active pixels, or from information that is acquired at different times. Such array is shown in FIG. 6 in a most simple form. Two pixels of an array are shown, only relevant parts of the pixels are shown: (81),(82) are photo detectors, (91), (92) are schematic representations of the amplifying part of the pixel.

- The switches (83), and (84) are closed and open respectively. Either one of the detectors (81) or (82) is tied to the amplifier (91) (and similarly for all other members of the array). The reference state for such a reading may be during the time that (81) is tied to (91), and the reading state is then during the time that (82) is tied to (91). Somewhere down the signal path the output of (91) is corrected using the amplifying circuit (5) as shown in FIG. 2. The function that is realized in this particular way is a spatio-temporal filter where the intensity at one pixel at one time is subtracted from the intensity of another pixel at another time. Several pixels in a neighborhood could be tied at the same node, at the same or different times, thus realizing more complex spatio-temporal filters. In principle the rectangles (81) and (82) may represent active pixels themselves, thus creating a hierarchic structure.

- An array may be different from the classic two-dimensional (rectangular) array. E.g. a linear array, a circular, a log-polar, even a random array is possible. If the technology allows so, a 3-dimensional array may become possible. The array could be made up of other types of detectors than optical detectors, as sensors for electro-magnetic radiation, elementary particles, pressure waves (sound), chemicals, . . . .

In FIGS. 2 & 5, the current source (12),(62) may be replaced by a resistor, or it may be combined with switch (28),(78) in one component (note that e.g. both a current source or a switch can be realized with a MOSFET).

As mentioned before, second amplifier (11),(61) may be omitted (shunted). The circuit could be tuned to operate without second amplifier (11),(61) or it may include also filtering or a voltage offset which may contribute to a better operation (high speed, low noise, operation in required voltage range etc.).

Switch (26), (76) in FIGS. 2 & 5 may be replaced by a current source or a resistance or any device that can keep the source of (9),(59) at a certain voltage that must not be explicitly applied.

In the above disclosure for simplicity it is supposed that the active pixels (1),(2),(3),(4),(51),(52),(53), (54) output is a voltage. In practice, an active pixel may output its signal via a transistor, of which the load is common for the bus, and resides outside the pixel. The transistor together with the external load element (being a passive component like a resistor, or an active component like a MOSFET), is a transistor amplifier, typically a source follower, an inverting amplifier, or a differential amplifier.

It is obvious that active pixels (1),(2),(3),(4),(51),(52), (53),(54) which output a current instead of a voltage may be used as well. A current may be converted to a voltage over a resistor or a switched capacitor.

It is obvious that, wherever MOSFETs are mentioned in this text, other types of controlled amplification devices can be thought, as far as they can realize the same functions, as bipolar transistors or J-FETs.

As the difference between active pixel and passive pixel lies merely in the presence of an amplifying element in the pixel, the method may be applied to cancel the FPN of passive pixels too. For this purpose the charges of the passive pixel can first be converted.

It is possible to realize an FPN-free reading of an active pixel array in other ways:

- by reading the said two states separately and doing the subtraction outside the imaging device, in analog or in digital mode after AD-conversion. Such an approach requires a double readout speed, and some kind of analog or digital memory.

- by using other types of differential amplifiers at the column edges. The signals of the two states may be stored on a capacitor, and the differential amplifier read the difference. This is a viable way of reading the active pixel signal, and removing the FPN of the active pixels, but it does not cancel FPN that is generated in the differential amplifier itself.

Figure 7:
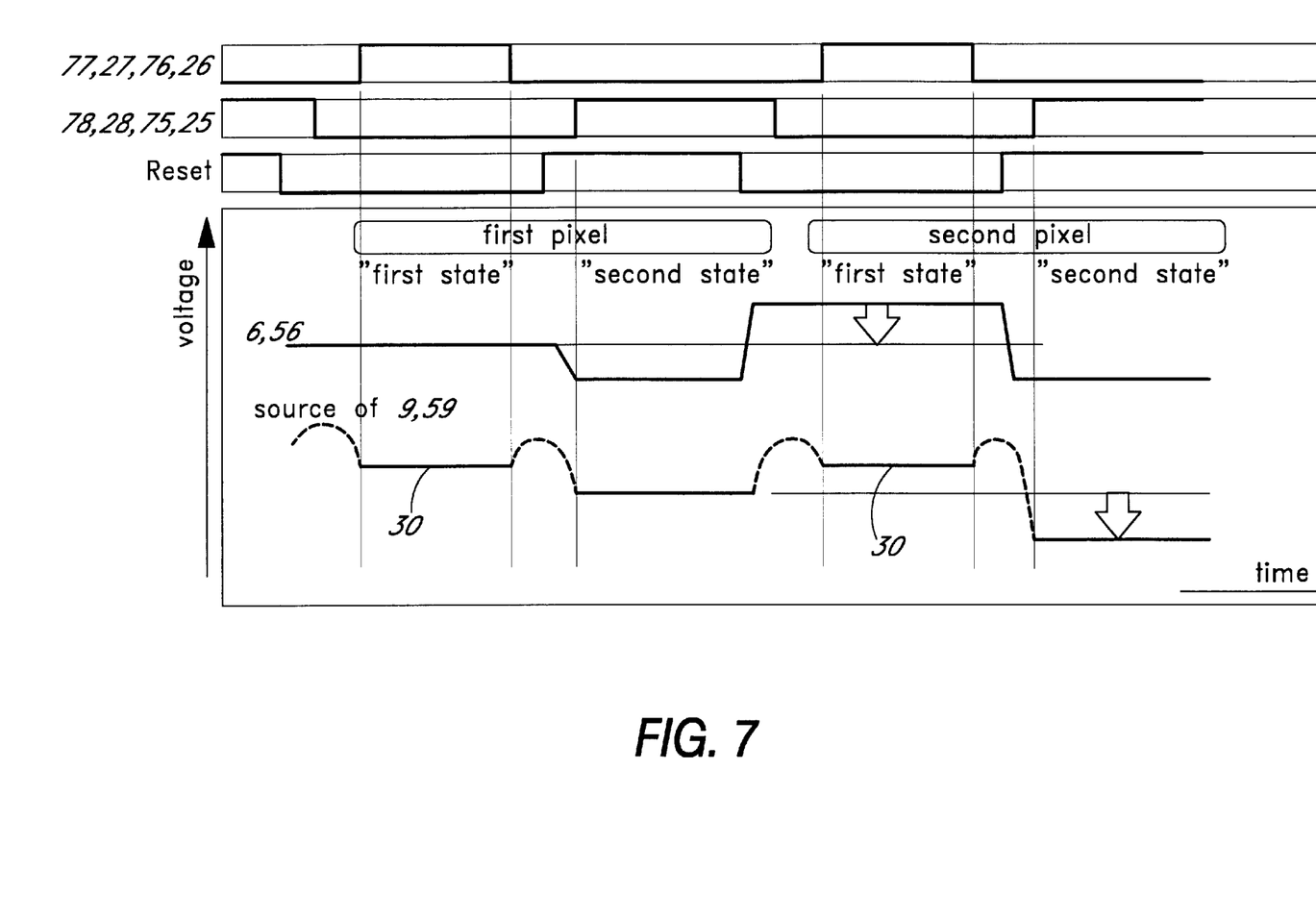
FIG. 7 schematically shows the timing diagram of the method for eliminating fixed pattern noise in a solid sate imaging device according to the present invention.

A timing scheme of the FPN elimination method according to the present invention is shown in FIG. 7. The signals to be expected at terminals of the preferred embodiments (see figures hereabove), while reading two pixels on the same column are shown. The shown applied binary signals are (77),(27),(76),(26),(78),(28) and (75),(25) (which are the same for simplicity; but in combination with a multiplexer (not drawn) (75),(25) is different from (78),(28), and Reset, which sets the pixel in a reset state or not (indicated as "first state" and "second state"). Two analog signals are shown: (6),(56), the voltage of the column line which reflects the output of the pixel(s) connected to it, and which is the input of the column amplifier (5),(55); and the voltage at the source of transistor (9),(59), which is the output of the column amplifier (5),(55). The white arrows indicate the difference of the resulting signal going from pixel (1) to pixel (2).

Figure 8:
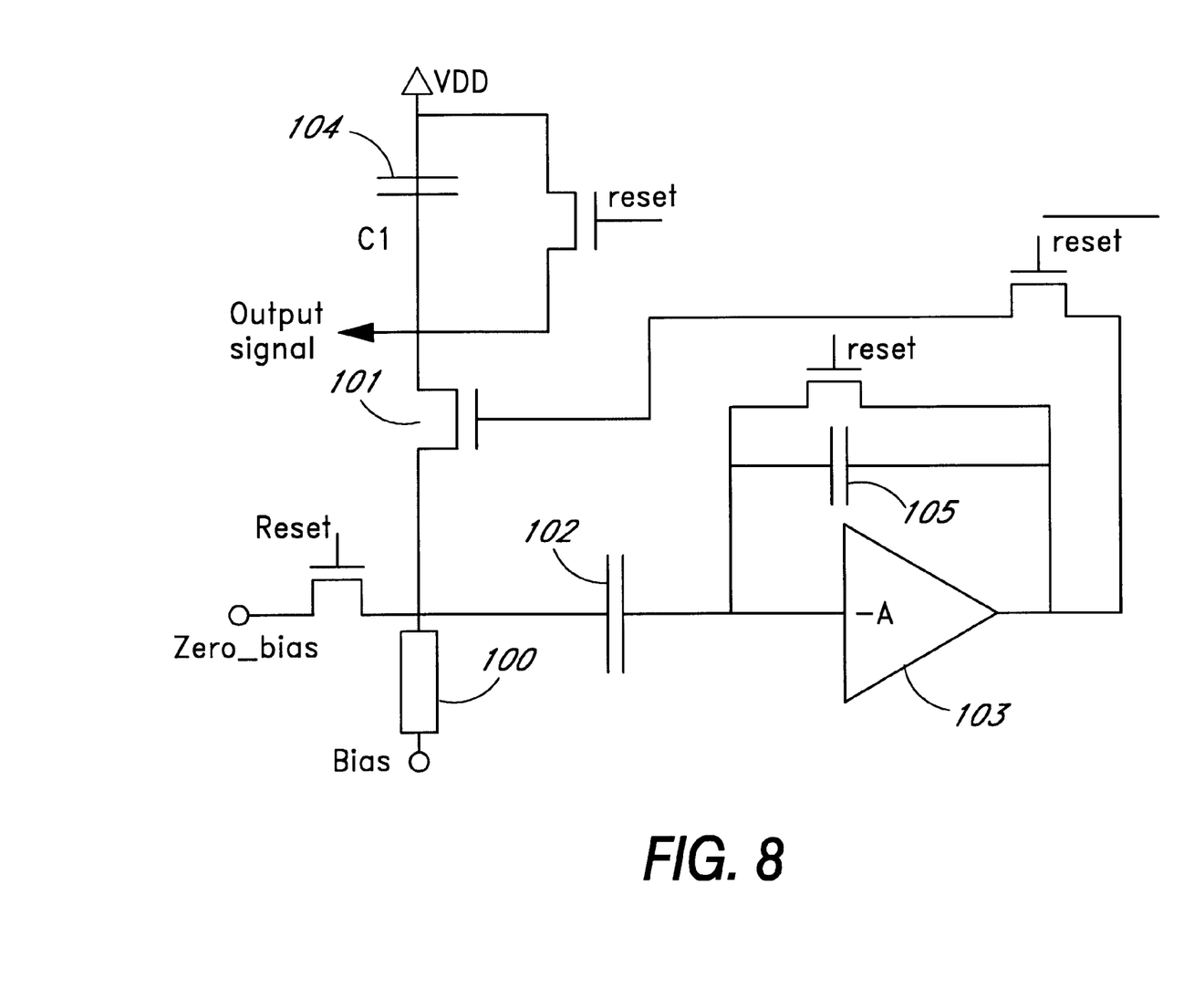
FIG. 8 shows an embodiment (further referred to as ACI) of the present invention with the amplifying circuit in connection with a photosensitive element.

Another embodiment of the present invention is shown in FIG. 8. A pixel incorporating a photosensitive element and an amplifying circuit comprising an amplifying element (101) and a memory element (102) is shown. Furthermore shown are connections and circuits to adjust the signal in an output terminal of said amplifying element (101) to a known level, a measurement of the corresponding level in a control terminal of said amplifying element being stored on said memory element. A prior art amplifying circuit is shown in FIG. 9.

Figure 9:
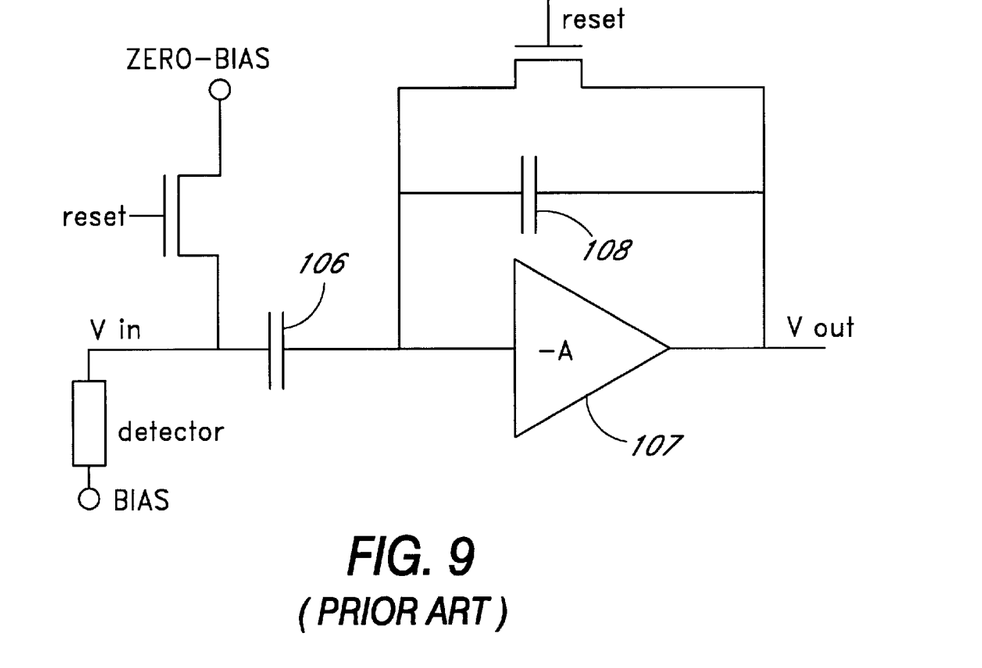
FIG. 9 shows a prior art amplifying circuit.

The pixel shown in FIG. 9 advantageously is used in case the photo-current of a photosensitive element or a detector is readout by an amplifier with capacitive feedback (108), which integrates this photo-current and gives an output voltage that is proportional to the photo-current and integration time. The integration time is determined by timing signals, the photo-current and an integration capacitor (108). Another (second) capacitor (106) is needed to allow the voltage (Bias minus zero-Bias) across the photo detector to be controlled in a precise way. Specific applications require such features for reasons of photometric performance. One operational disadvantage of the amplifying circuit of FIG. 9 is that, for good suppression of the parasitic effects at the input, the ratio of the capacitances of both capacitors (106) and (108) should be as large as possible. In some cases, this ratio should be larger than 1000. Yet for some applications, the capacitance of said integration capacitor (108) is 1 pF as imposed by the magnitude of photo detector current. Thus, the second capacitor (106) should be 1 nF in such cases. Such a large capacitor cannot be integrated on chip.

A new charge amplifying circuit making use of the present invention is therefore disclosed in FIG. 8.

In order to overcome the need of a large number of discrete capacitors in the circuit of FIG. 9, a pixel as shown in FIG. 8 is proposed. Here, an amplifying circuit based on the present invention is presented. Said amplifying circuit is referred to as the AC-coupled direct injection circuit (ACI). An AC-coupled amplifier in the feedback loop (103) is used to adjust the input mode of the amplifying element (101), preferably a MOSFET transistor. The photo-current is integrated on a third capacitor (104). The column amplifier of the present invention is used in combination with a photo receptor forming thus a pixel. As the capacitors in this embodiment may have small values, the circuit can be integrated easily on chip, as a single element or as pixel arrays. Another advantage of this circuit is that the variation and drift of the bias voltage across the photo receptor is very low.

Figure 10:
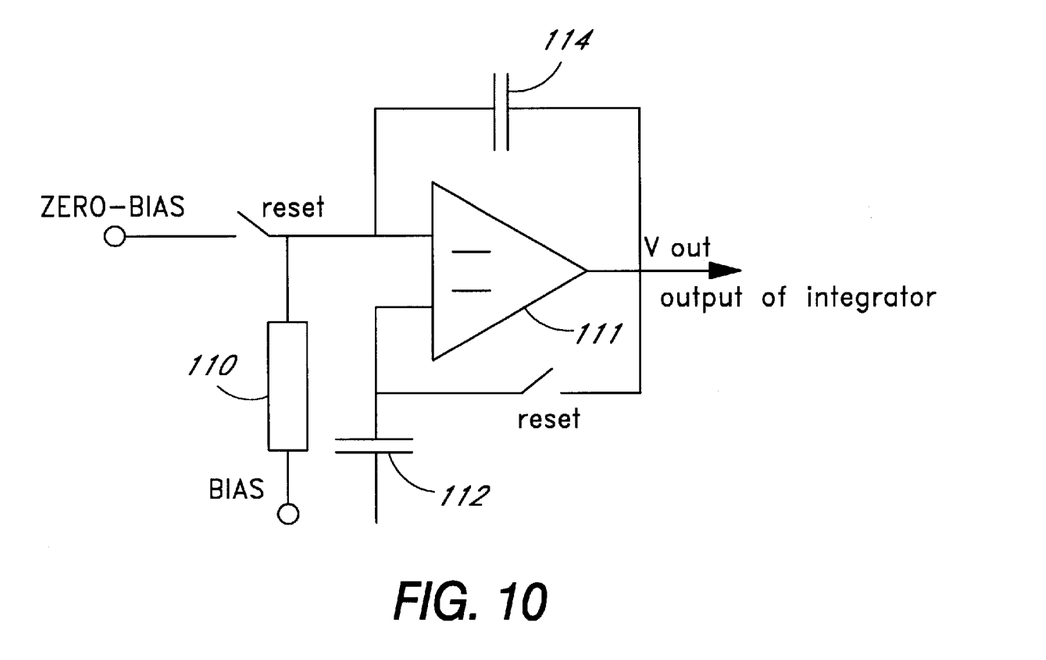
FIG. 10 shows another embodiment (further referred to as AR) of the present invention with the amplifying circuit in connection with a photosensitive element.

Another improvement of the AC-coupled transimpedance amplifier is shown in FIG. 10. This circuit is referred to as AC-regulated transimpedance amplifier (AR).

Here, the drawback of using a large second capacitor is solved by using an amplifying circuit according to the present invention. The memory element (112) is combined with a switch "reset". An amplifier (111) with an extra offset input is used as the feedback amplifier and at the same time as the amplifying element. The photo detector's current is integrated on the capacitor (114).

As a normal transimpedance amplifier configuration, the current is integrated on a feedback capacitor (114). Yet during reset, the zero-bias voltage is enforced on the amplifier's input (111) and the offset imbalance is stored on the capacitor (112).

Figure 11:
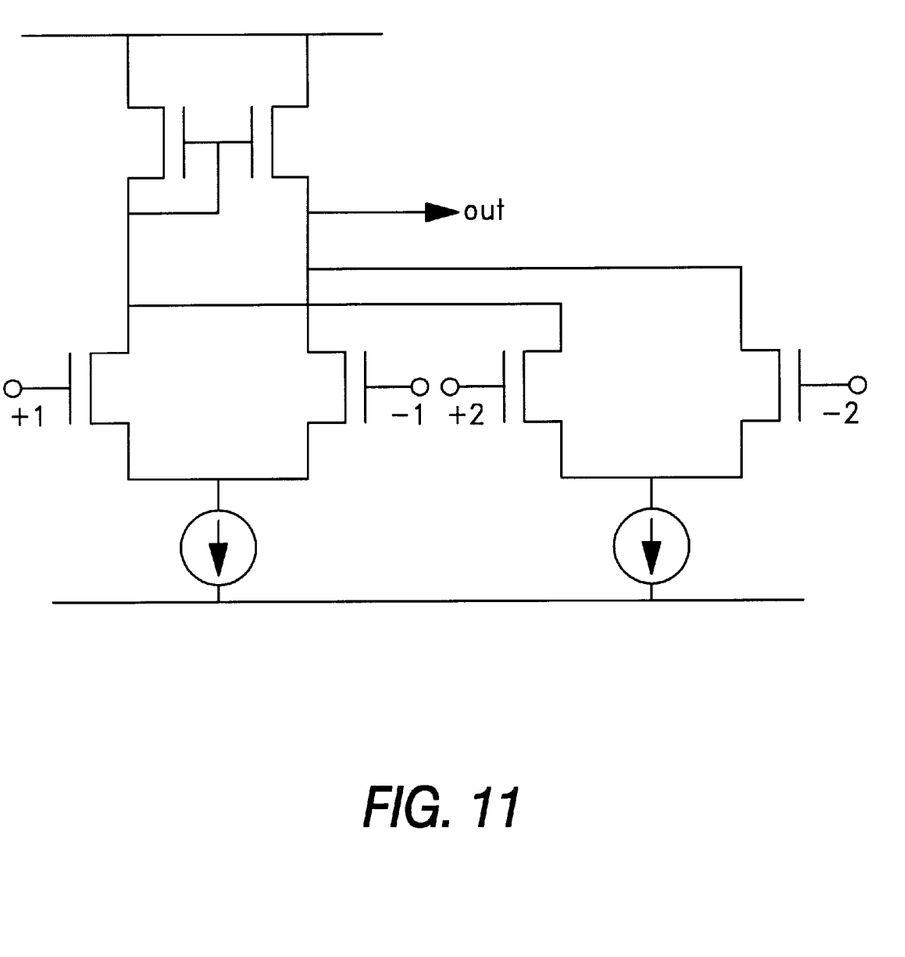
FIG. 11 shows a differential amplifier with similar use as the amplifiers of FIG. 3.

The circuit as shown in FIG. 11 is an example of a differential amplifier with two negative and two positive input nodes which could be used in amplifier (111).

Figure 12:
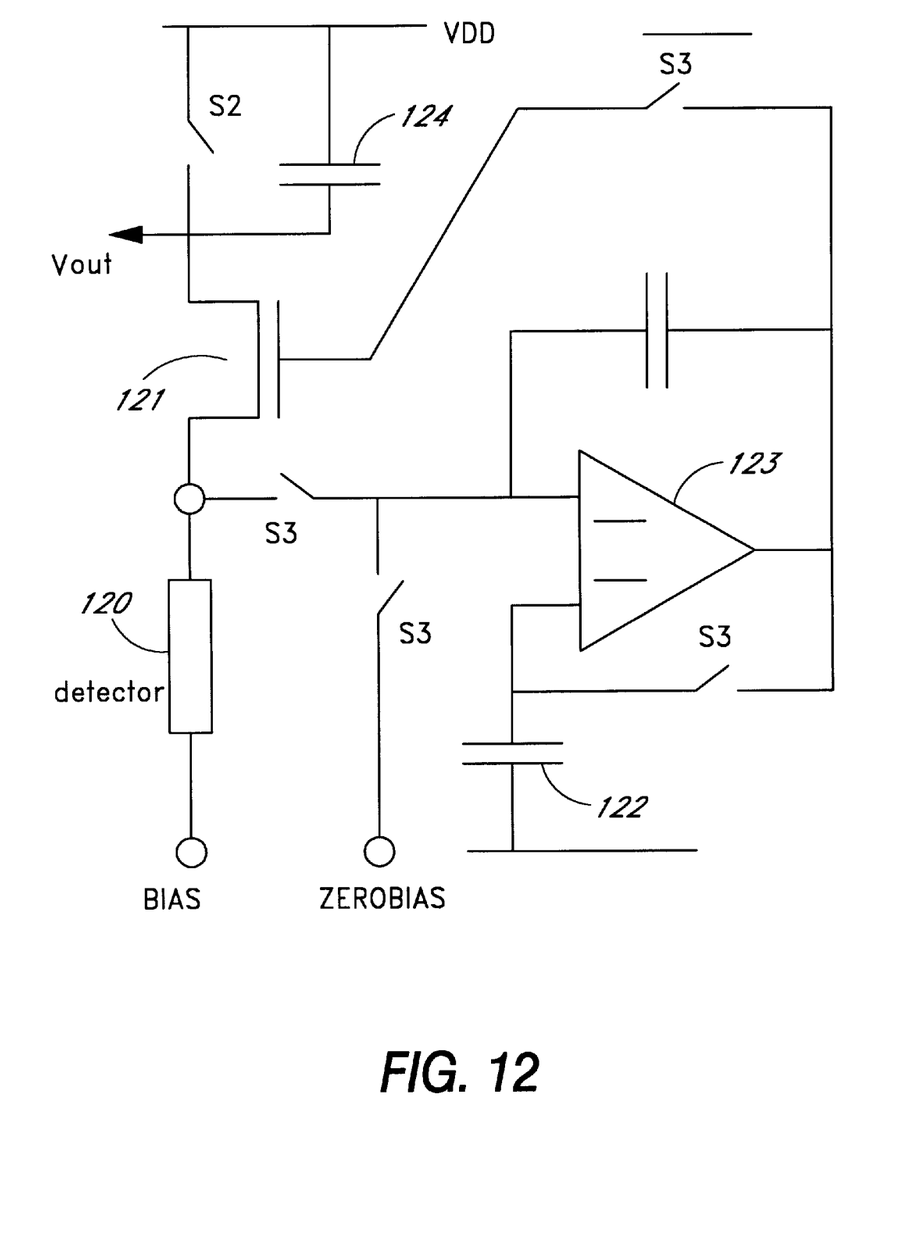
FIG. 12 shows another embodiment (further referred to as ARI) of the present invention with the amplifying circuit in connection with a photosensitive element.

The circuits of FIGS. 8 and 10 can be combined in one circuit. Such combined circuit (AC-regulated direct injection (ARI) circuit) is represented in FIG. 12. The memory element (122) is a capacitor in combination with a switch S3. The analog signal on this memory element is the input on an additional offset correcting input of a second amplifier (123) which in turn adjust the gate voltage of the amplifying element (121).

This circuit combines the following advantages:
precise control of the BIAS-ZERO BIAS voltage over the photo detector,
no need for large capacitor, the amplifier can be integrated on chip in combination with a photo receptor (120).

Advantageously, said pixels can be used in cryogenic readout amplifiers possibly in stressed GeGa detector arrays. For space applications and for low leakage applications, the Germanium-Gallium (Ge:Ga) detectors should be operated at 1.6 Kelvin, at a bias voltage of 20 mV. The closely coupled readout electronics should be operated at the same temperature and maintained this bias with an accuracy of 0.1 mV.

What is claimed is:

1. A method for reducing noise in a solid state imaging device having a group of active pixels, said method comprising the steps of:

reading out the signal of a pixel in a first state while forcing the output voltage of an amplifying element that is connected to said pixel to a predetermined output voltage level, thereby defining a corresponding voltage level on a control terminal of said amplifying element and storing said corresponding voltage level or a measure thereof on a memory element that is connected to said pixel and thereby defining, a first voltage at the output of said amplifying element;

subtracting said first voltage at the output of said amplifying element from a second voltage at the output of said amplifying element, said second voltage being defined by the output signal of the same pixel in a second state and said second voltage including the voltage level stored on said memory element, whereby the output voltage of the amplifying element shifts proportionally to the difference of the signal of said pixel in said first and said second state;

transferring the subtracted signal to an output line that is common for said group; and repeating this operation for essentially all or part of the pixels of the imaging device.

2. The method as recited in claim 1, wherein said first and second state of said pixel are read out consecutively.

3. The method as recited in claim 2, wherein said first state or said second state corresponds to an amount of radiation or light collected on the radiation or light sensitive element in said pixel or to the dark condition of said pixel or to the reset state of said pixel.

4. The method as recited in claim 3, wherein said second state corresponds to a non-illuminated condition of said pixel.

5. The method as recited in claim 2, wherein said first state corresponds to a non-illuminated condition of said pixel.

6. The method as recited in claim 5, wherein said second state corresponds to an amount of radiation or light collected on the radiation or light sensitive element in said pixel.

7. The method as recited in claim 2, wherein said predetermined output voltage level is derived from a supply voltage of said solid state imaging device.

8. The method as recited in claim 1, wherein said predetermined output voltage level is derived from a supply voltage of said solid state imaging device.

9. The method as recited in claim 1, wherein said solid state imaging device is a camera system.

10. The method as recited in claim 1, wherein forcing the output voltage of the amplifying element comprises directly adjusting said output on the output terminal of the amplifying element and indirectly adjusting said corresponding voltage level on a control terminal.

* * * * *